United States Patent [19]

Harvey et al.

[11] Patent Number: 5,212,711
[45] Date of Patent: May 18, 1993

[54] HARMONICALLY MODE-LOCKED LASER

[75] Inventors: George T. Harvey, Princeton; Linn F. Mollenauer, Colts Neck, both of N.J.

[73] Assignee: AT&T Bell Laboratories, Murray Hill, N.J.

[21] Appl. No.: 835,813

[22] Filed: Feb. 18, 1992

[51] Int. Cl.$^5$ .............................................. H01S 3/098
[52] U.S. Cl. .................................... 372/94; 372/18; 372/25
[58] Field of Search ....................... 372/25, 94, 19, 22, 372/30, 98, 18, 6

[56] References Cited

U.S. PATENT DOCUMENTS

| | | | |
|---|---|---|---|
| 4,400,814 | 8/1983 | Fork et al. | 372/94 |
| 4,700,339 | 10/1987 | Gordon et al. | 370/3 |
| 4,727,553 | 2/1988 | Fork et al. | 372/25 |
| 4,881,790 | 11/1989 | Molenauer | 350/96.16 |
| 5,035,481 | 7/1991 | Mollenauer | 350/96.16 |
| 5,039,199 | 8/1991 | Mollenauer et al. | 359/334 |
| 5,042,040 | 8/1991 | Harvey et al. | 372/18 |

OTHER PUBLICATIONS

"Mode-Locked Erbium-Doped Fiber Laser with Soliton Pulse Shaping," J. D. Kafka et al., Optics Letters, vol. 14, No. 22, Nov. 15, 1989, pp. 1269-1271.
"Picosecond Pulse Generation from Actively Mode-Locked Erbium-Doped Fibre Laser," A. Takada et al., Electronics Letters, vol. 26, No. 3, Feb. 1, 1990, pp. 216-217.
"Fabrication and Characterization of Low-Loss Optical Fibers Containing Rare-Earth Ions," S. B. Poole et al., Journal of Lightwave Technology, vol. LT-4, No. 7, Jul. 1986, pp. 870-875.
"Erbium Fibre Soliton Laser," by K. Smith et al., Electronics Letters, vol. 26, No. 15, Jul. 19, 1990, pp. 1149-1151.

Primary Examiner—James W. Davie
Attorney, Agent, or Firm—R. B. Anderson

[57] ABSTRACT

The invention is an improvement of a harmonically mode-locked ring laser of the type comprising means (12) defining an optical path, an active laser medium (15) for emitting coherent light to be transmitted along the optical path, and means (18) included in the optical path for causing the light to propagate along the path as a train of pulses having a period which is substantially equal to the transit time of light pulses in the optical path divided by an integer. The improvement is characterized in that the optical path includes a Fabry-Perot optical resonator (24) having a free spectral range substantially equal to the pulse repetition rate of the optical pulses in the ring laser. Under this condition, the Fabry-Perot resonator tends to equalize the energy, shape and width of the individual pulses.

14 Claims, 1 Drawing Sheet

HARMONICALLY MODE-LOCKED LASER

TECHNICAL FIELD

This invention relates to optical pulse generators and, more particularly, to harmonically mode-locked ring lasers.

BACKGROUND OF THE INVENTION

The U.S. patents of Gordon et al., U.S. Pat. No. 4,700,339, granted Oct. 13, 1987 and Mollenauer, U.S. Pat. No. 4,881,790, granted Nov. 21, 1989, are examples of the literature describing the advantages of using solitons for long distance optical fiber transmission of information. Solitons are pulses of light having a particular shape, width and energy that allows each pulse to propagate great distances on single-mode optical fiber while maintaining its shape and pulse width. For propagation on single-mode glass optical fibers, such pulses would ideally have a hyperbolic secant squared intensity envelope. Such a pulse causes certain nonlinear effects of the single-mode fiber to compensate for the effects of chromatic dispersion in the fiber. Pulses having the smallest possible time-bandwidth products for the spectra given, as is characteristic of ideal soliton pulses, are referred to as "transform limited pulses." Among other advantages of soliton transmission is the practicality of using erbium amplifiers, rather than repeaters, for amplifying the transmitted signal; soliton transmission also permits wavelength division multiplexing and polarization division multiplexing, which can further increase transmission line capacity.

The papers, "Mode-Locked Erbium-Doped Fiber Laser with Soliton Pulse Shaping," J. D. Kafka and T. Baer, *Optics Letters*, Vol. 14, No. 22, Nov. 15, 1989, pp. 1269–1271, and "Picosecond Pulse Generation from Actively Mode-Locked Erbium-Doped Fibre Laser," A. Takada, H. Miyazawa, *Electronics Letters*, Vol. 26, No. 3, Feb. 1, 1990, pp. 216–217, are examples of the literature that describe the use of harmonically mode-locked fiber ring lasers for generating short pulses. The ring lasers described use an optical pump for exciting an erbium fiber amplifier located in a closed loop resonator path. An electrooptic modulator in the path is driven at an appropriate frequency to form the laser light into pulses having a repetition rate harmonically related to the frequency spacing between adjacent resonant modes of the closed loop resonator path. Pulses of light circulating around the closed loop of the ring laser are coupled out from the closed loop and constitute the pulses that can be used for soliton transmission. It can be shown that the pulses generated by actively mode locked lasers tend to have a Gaussian shape, but this pulse shape is sufficiently close to the desired hyperbolic secant squared pulses that they can be used in soliton transmission systems. Unfortunately, we have found that harmonically mode-locked ring lasers have a tendency to produce a train of pulses having amplitude variations. These pulse amplitude variations and other manifestations of instability are the result of inherent unwanted interaction between modes in the closed loop of the ring laser.

Accordingly, there is a continued need for practical optical pulse sources for use in optical fiber transmission, and particularly for practical soliton sources.

SUMMARY OF THE INVENTION

The invention is an improvement of a harmonically mode-locked ring laser of the type comprising means defining an optical path, an active laser medium for emitting coherent light to be transmitted along the optical path, and means included in the optical path for causing the light to propagate along the path as a train of pulses having a period which is substantially equal to the transit time of light pulses in the optical path divided by an integer. The improvement is characterized in that the optical path includes a Fabry-Perot optical resonator having a free spectral range substantially equal to the pulse repetition rate of the optical pulses in the ring laser. Under this condition, the Fabry-Perot resonator tends to equalize the energy, shape and width of the individual pulses.

These and other objects, features, and advantages of the invention will be better understood from a consideration of the following detailed description taken in conjunction with the accompanying drawing.

DETAILED DESCRIPTION

Figure 1:
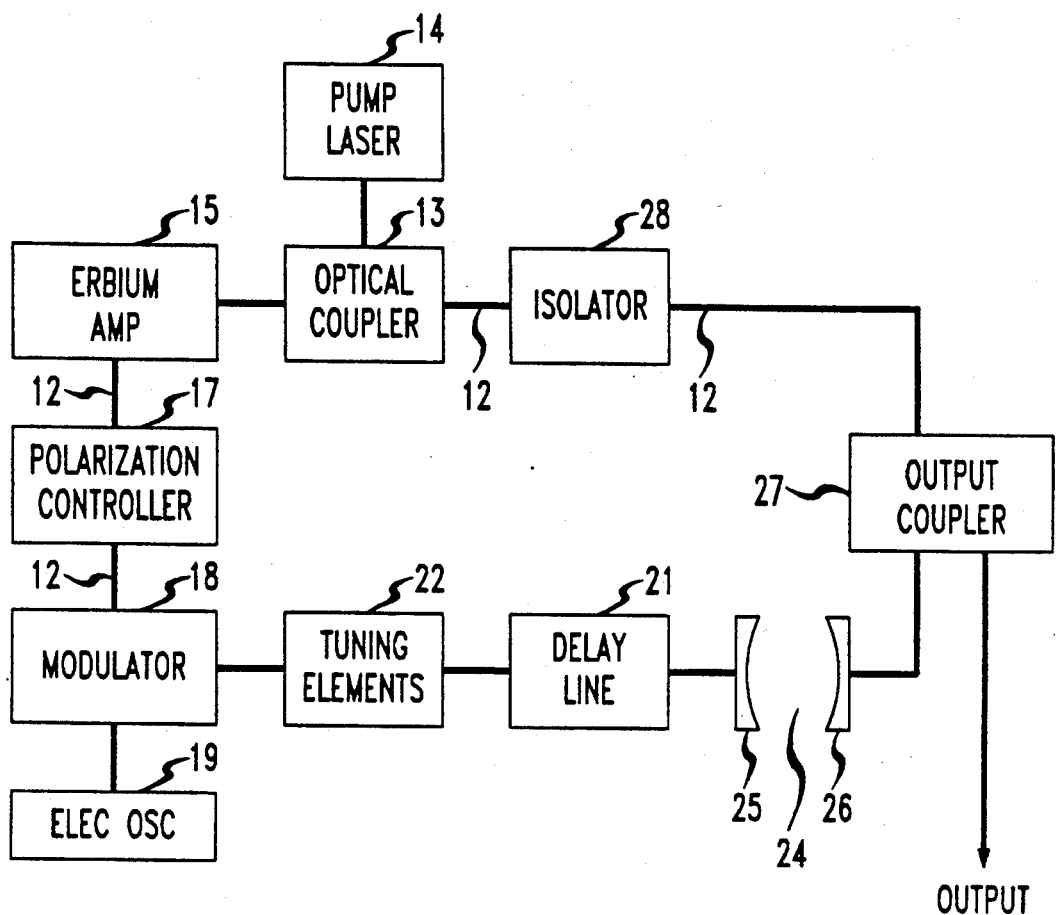
FIG. 1 is a schematic illustration of a harmonically mode-locked ring laser in accordance with an illustrative embodiment of the invention.

Referring now to the drawing, there is shown a harmonically mode-locked ring laser in accordance with an illustrative embodiment of the invention in which part of a closed loop optical transmission path is defined by a single-mode optical fiber 12. An optical coupler 13 directs optical energy from a pump laser 14 to an erbium fiber amplifier 15. The erbium fiber amplifier 15 is an active laser medium of the type described, for example, in the paper, "Fabrication and Characterization of Low-Loss Optical Fibers Containing Rare-Earth Ions," S. B. Poole et al., *Journal of Lightwave Technology*, Vol. LT-4, No. 7, July 1986, pp. 870–875, which comprises an erbium-doped length of optical fiber that amplifies light along its optical fiber path when appropriately pumped by energy from the pump laser 14. As is known, various other kinds of active laser media can be used for amplifying light in a harmonically mode-locked ring laser. The light energy propagates around the closed loop defined by the optical transmission path, with a polarization controller 17 being used to compensate for polarization changes in the ring, as is known. The polarization controller may simply comprise appropriate loops of optical fiber having a length to give an appropriate transformation to the polarization; if the polarization maintenance of circulating light is not a problem, the controller 17 may not be needed.

Figure 2:
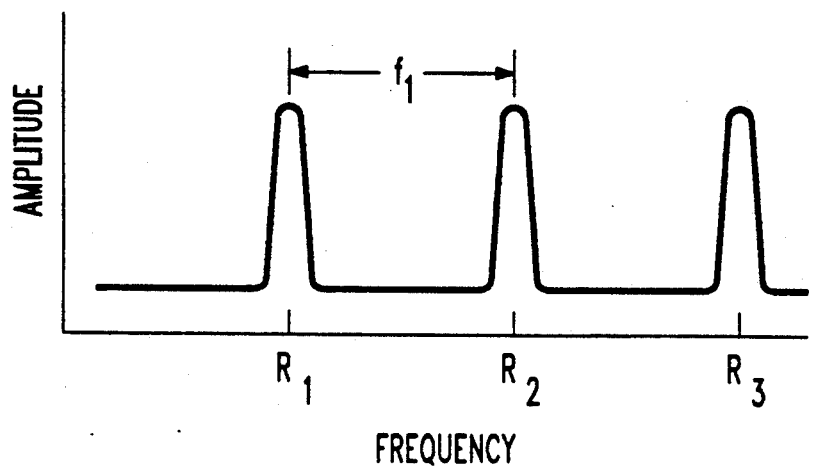
FIG. 2 is a graph of the natural modes of the ring of FIG. 1.

A modulator 18 modulates the intensity of the coherent light so as to make it in the form of a succession of pulses. It may typically be a known Mach-Zehnder lithium niobate modulator driven at a frequency in the gigahertz range by an electronic oscillator 19 to form optical pulses having a corresponding repetition rate. The frequency of modulation is chosen such that the pulse repetition rate has a period substantially equal to the transit time of light pulses around the optical path divided by an integer, or $$T = t/N \qquad (1)$$

where T is the period of the optical pulses, t is the transit time of light pulses around the closed-loop path, and N is an integer. Referring to FIG. 2, the closed-loop path has a plurality of resonant frequency modes, $R_1$, $R_2$, $R_3$ - - $R_n$. It can be shown that compliance with equation (1) results in a pulse repetition rate $f_2$ given approximately by $$f_2 = Nf_1 \qquad (2)$$

where $f_1$ is the frequency separation between adjacent resonant modes as depicted in FIG. 2.

An adjustable delay line 21 allows the transit time in the ring to be made equal to an integral multiple of the period of modulation so that harmonics of the drive frequency coincide with the longitudinal modes of the ring. The wavelength of the laser is controlled by tuning elements 22 which may comprise, as is known, an angle-tuned band pass interference filter to set the approximate optical wave length and a solid etalon for fine tuning.

In accordance with the invention, part of the ring or closed loop is defined by a Fabry-Perot resonator 24 comprising partially transparent mirrors 25 and 26, which as will be explained below, has the effect of equalizing the amplitude of the output pulses. A portion of the pulse train circulating in the ring is removed from the ring by an output coupler 27 and is transmitted as output pulses as shown. In accordance with the invention, these pulses can be used as solitons for transmission on a single-mode optical fiber to obtain the known benefits of soliton transmission of information. An isolator 28 is included in the ring to direct propagation in the ring in the counterclockwise direction as has been described.

Harmonically mode-locked ring lasers, substantially as described, produce pulses having a substantially Gaussian shape which are sufficiently close to the hyperbolic secant shape of soliton pulses that they can be used for soliton transmission. That is, they sufficiently balance optical fiber nonlinear effects with chromatic dispersion effects to permit transmission over great distances without significant distortion of the pulse. Unfortunately, we have found that harmonically mode-locked lasers of the prior art include unwanted oscillation modes which tend to result in output pulses of unequal magnitude or amplitude. Such fluctuations can be sufficiently dramatic as to render the apparatus useless, at least as a soliton source.

In accordance with the invention, these problems are solved by the incorporation of the Fabry-Perot resonator 24 having a free spectral range substantially equal to the pulse repetition rate of the optical pulses in the ring laser. A Fabry-Perot resonator defines a multiplicity of equally spaced resonances, and has a free spectral range (FSR) defined as the frequency separation of two adjacent cavity modes. Consider FIG. 2 to represent the frequency modes of the Fabry-Perot resonator; the FSR is then equal $f_1$. The FSR is also given by:

$$FSR = c/2d \qquad (3)$$

where c is the speed of light in the resonator and d is the optical path length between the opposite mirrors 25 and 26.

In accordance with the invention, the resonator 24 has an FSR that is substantially equal to the pulse repetition rate $f_2$ of the ring laser or $$FSR = f_2 \qquad (4)$$

With this condition met, the Fabry-Perot resonator equalizes the energy carried by the successive pulses, thereby equalizing the pulse amplitude of the generated pulse train. The ring laser modes nearest coincidence with the resonant peaks of the resonator 24 produce laser emission of radiation, while competing modes are suppressed. Equations (3) and (4) say that the round trip time of light in the resonator 24 corresponds to the desired pulse period.

To fully suppress the unwanted modes of the ring, the width of the Fabry-Perot resonator modes should be on the order of, or narrower than, the ring mode frequency spacing. This can always be accomplished by making the reflectivities of the Fabry-Perot resonator mirrors sufficiently high. If other optical resonators could be made which display these essential characteristics of the Fabry-Perot resonator, such resonators could be used in place of the Fabry-Perot resonator 24. It is our present understanding, however, that the Fabry-Perot resonator is the most practical structure and is therefore preferred for implementing the invention as described.

An experimental ring laser embodying the invention has been made and demonstrated operating at a wavelength of 1.555 microns. One hundred milliwatts of pump power was applied at a wavelength of 1.48 microns. The total length of the closed-loop ring was twenty meters. The optical coupler 13 was one commercially available as model number WD1415M1-A1 from the JDS Fitel Company of Nepean, Ontario, Canada. The erbium fiber amplifier 15 was fifteen meters long of standard amplifier design. The polarization controller 17 was of the type known as a rotatable paddle type of controller having three paddles, each having two loops of fiber each with a one inch diameter. The tuning elements comprised a tuning etalon which was a 0.5 millimeter thick parallel quartz plate with seventy-three percent reflectivity coatings at a wavelength of 1.555 microns, commercially available from Virgo Optics, Port Ritchie, Fla., and a bandpass filter, which was a two nanometer wide tilt tunable filter having a 1560 nanometer center wavelength at normal incidence, available from Omega Optical, Brattlebroro, Vt. The 2.5 gigahertz Fabry-Perot resonator 24 employed ninety-eight percent reflectivity mirrors, and had seventy-five millimeters radius of curvature and sixty millimeters spacing. The isolator 28 and the lithium niobate modulator 18 were standard commercially available products. The pulse width was easily controlled from thirty-five to over one hundred picoseconds by adjusting the modulation depth. The pulses were essentially transform limited and approximately Gaussian in shape with a time-bandwidth product of 0.44. Even shorter pulses could be produced by appropriately increasing the bandwidth of the tuning elements.

While the invention has been discussed in the context of producing pulses to be used for soliton transmission, it is to be understood that the optical pulse output may be used in other ways as well. Various other embodiments and modifications may be made by those skilled in the art without departing from the spirit and scope of the invention.

We claim:

1. A harmonically mode-locked ring laser comprising: means defining an optical path; an active laser medium for emitting coherent light to be transmitted along the optical path; means included in the optical path for causing the light to propagate along the path as a succession of pulses having a substantially uniform repetition rate at a sub-optic frequency and having a period substantially equal to the transit time of the light pulses in the optical path divided by an integer; wherein the improvement is characterized in that:

the optical path includes a Fabry-Perot optical resonator having a free spectral range substantially equal to said pulse repetition rate.

2. The laser of claim 1 further characterized in that: the means for causing the light to propagate as a succession of pulses comprises an optical modulator for modulating the transmission in the optical path at a rate equal to the pulse repetition rate.

3. The laser of claim 1 further characterized in that: the optical path describes a closed loop having a transit time substantially equal to an integral number of periods of said pulse repetition rate.

4. The laser of claim 1 further characterized in that: the active laser medium comprises an erbium doped single-mode optical fiber portion.

5. The laser of claim 1 further characterized in that: the succession of pulses are each sufficiently close to being of a hyperbolic secant shape to be used as a source of solitons.

6. An optical pulse generator comprising: means for defining a closed-loop optical transmission path; an active laser medium included in the transmission path; means for causing the active medium to emit coherent light of a predetermined frequency; means included in the optical transmission path for causing the emitted light to propagate along the transmission path as a succession of pulses having a substantially uniform pulse repetition rate at a sub-optic frequency; the length of the closed-loop path being substantially equal to an integral number of periods of said pulse repetition rate; and means for removing a portion of said pulses from said closed-loop optical transmission path; wherein the improvement is characterized in that:

said closed-loop transmission path includes an optical resonator having equally spaced resonances, adjacent resonances being separated by a frequency substantially equal to said pulse repetition rate.

7. The laser of claim 6 further characterized in that: the succession of pulses are sufficiently close to being transform limited to be used as a source of solitons.

8. The generator of claim 6 further characterized in that:
a major portion of the closed-loop transmission path is defined by a single-mode optical fiber.

9. The generator of claim 8 further characterized in that:
the closed-loop optical transmission path comprises a harmonically mode locked ring laser.

10. The generator of claim 9 further characterized in that:
the optical resonator is a Fabry-Perot resonator.

11. The generator of claim 10 further characterized in that:
the active laser medium comprises a rare-earth doped single-mode optical fiber portion.

12. The generator of claim 11 further characterized in that:
the means for causing the active medium to emit light comprises means for applying optical pump energy to the closed-loop optical transmission path.

13. The generator of claim 12 further characterized in that:
each of said pulses has a duration of less than one nanosecond.

14. The generator of claim 6 characterized in that:
the ratio of the width of the resonances to the spacing between the resonances is on the order of the ratio between the period of the pulse repetition rate to the optical transit time in the closed loop.

* * * * *